H. P. SORENSEN.
FLYING MACHINE.
APPLICATION FILED AUG. 26, 1920.
1,432,213.
Patented Oct. 17, 1922.
4 SHEETS—SHEET 3.
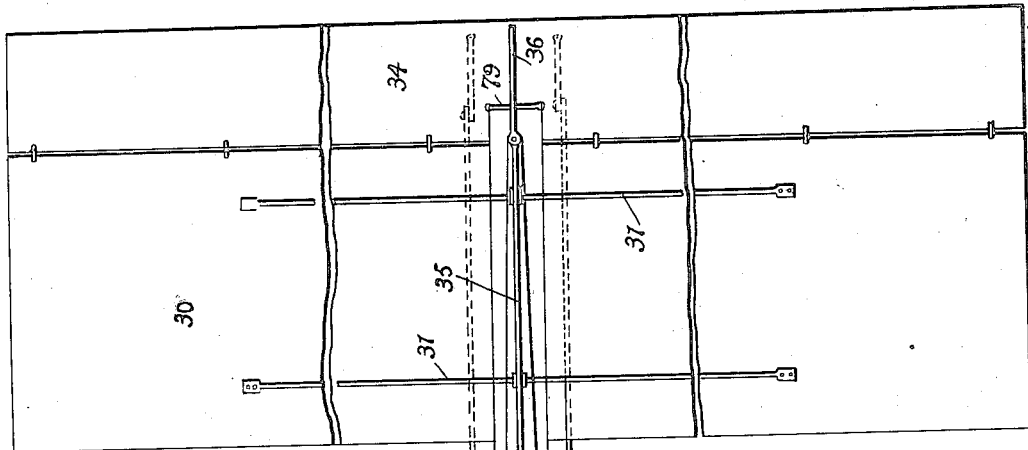
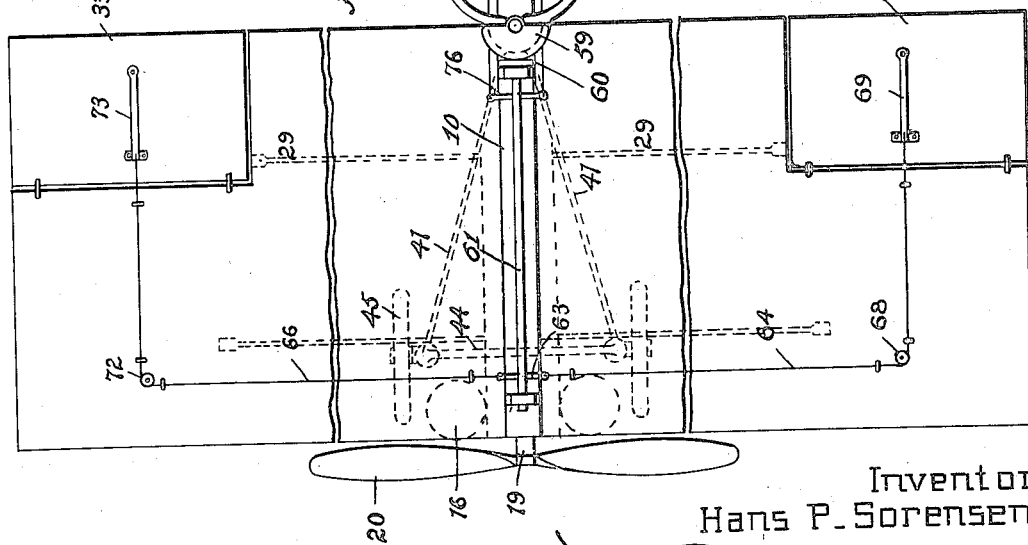
Inventor
Hans P. Sorensen
Attorneys

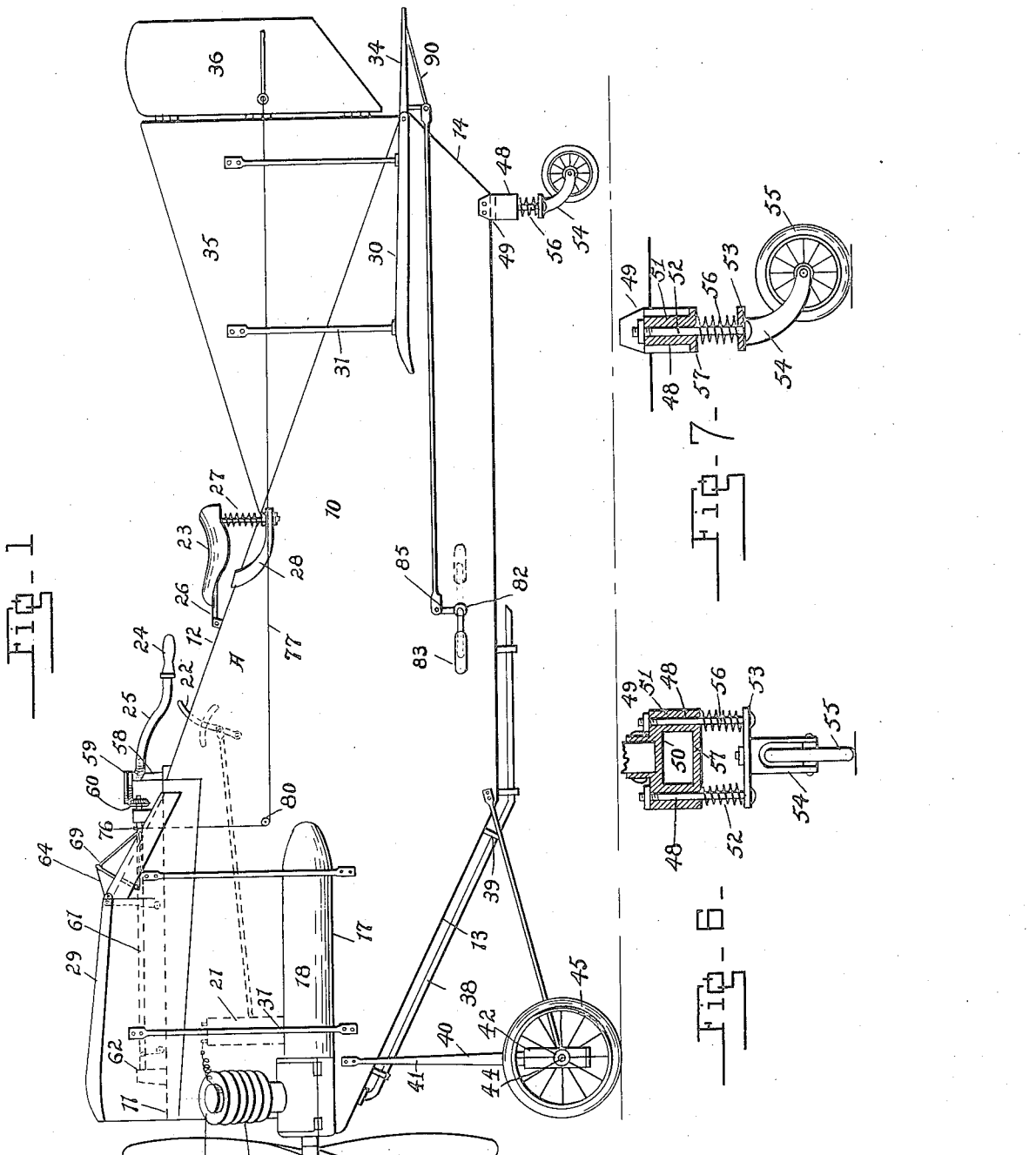

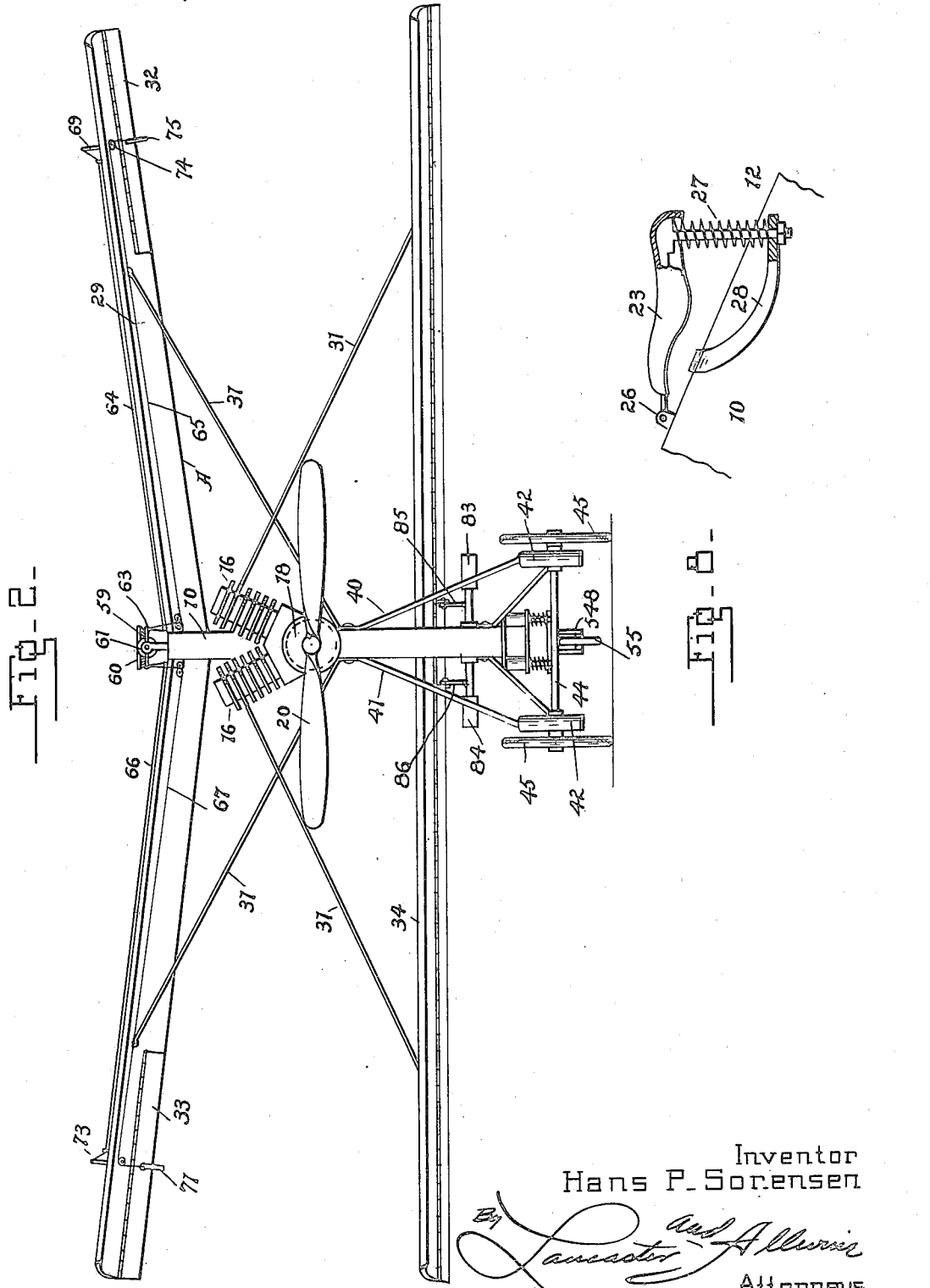

H. P. SORENSEN.
FLYING MACHINE.
APPLICATION FILED AUG. 26, 1920.

1,432,213.

Patented Oct. 17, 1922.
4 SHEETS—SHEET 4.

Inventor
Hans P. Sorensen

Attorneys

Patented Oct. 17, 1922.

1,432,213

UNITED STATES PATENT OFFICE.

HANS P. SORENSEN, OF OSSINING, NEW YORK.

FLYING MACHINE.

Application filed August 26, 1920. Serial No. 406,114.

*To all whom it may concern:*

Be it known that I, HANS PETER SORENSEN, a subject of Denmark, residing at Ossining, in the county of Westchester and State of New York, have invented certain new and useful Improvements in Flying Machines, of which the following is a specification.

This invention relates to aeroplanes and the primary object of the invention is to provide an improved aeroplane embodying a number of safety features and which is constructed to simulate the appearance of a motorcycle and designed to become the motorcycle of the air.

Another object of the invention is to provide a light aeroplane having a minimum head or wind resistance, which is particularly adapted for dispatch bearers, couriers, and the like.

A further object of the invention is to provide an improved aeroplane embodying a relatively thin vertically disposed body or fuselage, which acts in the nature of a stabilizer and a forwardly disposed upper plane and a rearwardly disposed lower plane.

A further object of the invention is the provision of an elevator carried by the lower plane, which extends the entire length of the trailing edge thereof and which acts in the nature of a brake, so as to permit the quick stopping or forward motion of the aeroplane and permits the landing of the same vertically.

A further object of the invention is to provide an aeroplane having an improved control, which embodies means for synchronously operating the ailerons and tail rudder.

A still further object of the invention is to provide a relatively light aeroplane constructed along the lines of a motorcycle, which is durable and efficient in use, one that is simple and easy to manufacture, and one which can be placed upon the market at a reasonable cost and operated by the ordinary layman.

With these and other objects in view the invention consists in the novel construction, arrangement and formation of parts, as will be hereinafter more specifically described, claimed and illustrated in the accompanying drawings, forming a part of this specification, in which drawings, Figure 1 is a side elevation of the improved aeroplane.

Fig. 2 is a front elevation of the same.

Fig. 3 is a top plan view of the improved aeroplane.

Fig. 6 is a vertical section through the tail skid.

Fig. 7 is a vertical section taken through the tail skid.

Fig. 8 is a fragmentary sectional view of the aeroplane illustrating the type of seat carried by the body or fuselage.

Figure 4:
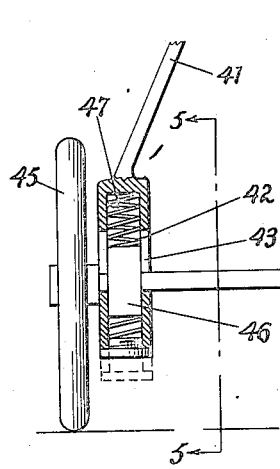
Fig. 4 is a fragmentary front view partly in section of the landing gear frame.
Figure 5:
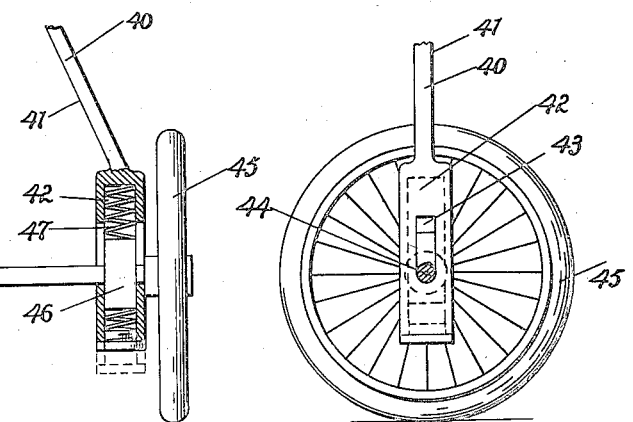
Fig. 5 is a detail section taken on the line 5—5 of Figure 4.
Figure 9:
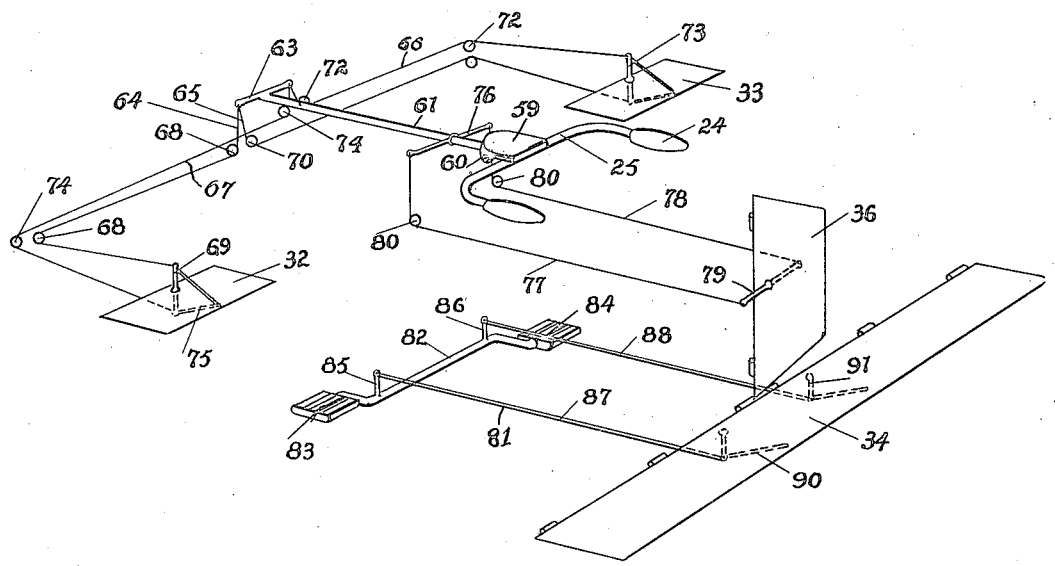
Fig. 9 is a diagrammatic perspective view of the improved control for the aeroplane.

Referring to the drawings in detail, wherein similar reference characters designate corresponding parts throughout the several views, the letter A generally indicates the improved aeroplane which includes the substantially flat vertically disposed body or fuselage 10. The body 10 is preferably formed of a rigid non-collapsing material, such as wood, aluminum or the like and owing to its position and shape acts as a stabilizer for the machine. The upper and forward end of the body is provided with a straight horizontally disposed face 11, which terminates short of the vertical transverse center thereof. The rest of the upper end of the body is inclined downwardly and rearwardly toward the rear end thereof, as at 12. The lower end of the body or fuselage 10 is positioned in a substantially horizontal plane and has its forward and rear edges inclined upwardly and forwardly and upwardly and rearwardly, respectively, as indicated at 13 and 14.

The forward edge of the body 10 is provided with an inwardly extending recess or cut out portion 15, in which is adapted to seat the internal combustion engine 16. The recess or cut out portion 15 also has communicating therewith at its lower edge the longitudinally extending slot 17, which is adapted to receive the fuel tank 18. The internal combustion engine 16 may be of any type and of any preferred horse power, but it is preferred, that the engine be constructed along the lines of a motorcycle engine. The crank shaft 19 of the engine projects forwardly of the flying machine and has connected thereto in the usual manner, the tractor propeller 20. It is preferred that the storage battery 21 for the ignition system of the engine be placed directly upon the fuel tank 18 and if so desired the body may be slotted for the reception of the same. Suitable control levers 22 for the spark and fuel of the engine may be connected to the body 10 adjacent to the driver's or pilot's seat 23, or if so desired, the spark and control lever may be connected to the handles 24 of the handle bars 25, which is utilized for steering and controlling the machine.

The seat 23 is constructed along the lines of any approved type of motorcycle seat and as shown the forward end of the same is pivoted as at 26 to a bracket carried by the body, while its rear end is supported by springs 27, which engage suitable outwardly extending brackets 28 secured to the opposite sides of the body.

The aeroplane includes a front plane 29 and a rear plane 30 and as clearly shown in Figure 1 of the drawings, the front plane is located at the upper edge of the body at the forward end thereof, while the lower plane 30 is located at a point adjacent to the lower edge of the body and at the rear end thereof. These planes 29 and 30 are of substantially the same size, but it is preferred that the upper plane projects upwardly and outwardly at an incline to the body, as clearly shown in Figure 2 of the drawings. Suitable braces or struts 31 are provided for connecting the planes 29 and 30 to the body and as shown these braces or struts extend in opposite relation to each other.

The trailing edge of the forward upper plane 29 at its opposite ends is provided with ailerons 32 and 33 and these ailerons, are controlled, by means, which will be hereinafter more specifically described.

An improved type of elevator and brake has been provided for the machine and consists of a hinged plane or fin 34 which extends the entire length of the trailing edge of the lower rear plane 30. The arrangement and shape of the elevator and brake forms an important part of my invention, as it will be seen that the same permits the quick stopping of the forward motion of the machine and permits the landing of the machine in a comparatively small space. The means for controlling the combined elevator and brake, will also be hereinafter more specifically described.

The inclined edge 12 of the body 10 has the rear end of the same provided with the vertical fin or stabilizer 35 and this stabilizer extends upwardly from the body and is arranged in aligned parallel relation therewith.

The rear edge of the stabilizer 35 has hinged thereto in any preferred manner, the tail rudder 36 and this tail rudder 36 is controlled, by means, which will be hereinafter more specifically described.

It can be seen by referring to Figure 1 that the seat 23 is located directly in front of the stabilizer 35 and in rear of the front upper plane 29. This seat is positioned on the inclined edge 12 of the body 10 and is thus located below the upper horizontal edge of the body, and permits the pilot to bend his body below or parallel with the upper edge of the plane 29. The exhaust pipe 38 for the engine 16 extends rearwardly of the machine and is secured by suitable brackets 39 to the lower edge of the same.

The forward end of the aeroplane is provided with the landing gear 40 which as shown consists of the diverging braces 41, which are connected to the opposite sides of the body 10 adjacent to its lower forward end. These braces extend downwardly below the body and terminate in vertically disposed aligned casings 42 the opposite sides of which are provided with aligned slots 43. An axle 44 extends transversely across the machine and through the slots 43 and supports the ground wheels 45, which may be constructed in any preferred manner and provided with pneumatic tires, if so desired. The portions of the axle 44, which are positioned in the casings 42 are provided with slide blocks 46 which are shaped to conform to the cross sectional configuration of the casings. Shock absorbing springs 47 are mounted within the casings 42 and these springs engage the terminals of the slide blocks 46 and prevent the shock of the landing from being transmitted to the body 10.

The rear end of the body 10 directly below the elevator and brake 34 is provided with a tail skid 48 which includes a U-shaped bracket 49, which is bolted or otherwise secured to the lower surface of the body. The U-shaped bracket 49 includes a base plate 50 which carries at its opposite ends the depending sleeves 51, which slidably receive the rods 52. The lower ends of the rods 52 carries a plate 53 which supports at its central portion for swinging movement the fork 54. The fork 54 has mounted therein the castor wheel 55. Coil springs 56 are wound around the rods 52 and are disposed between the upper surface of the plate 53 and the lower connecting plate 57 of the sleeves 51. Thus it will be seen that the tail skid 48 is also constructed along the lines of a shock absorbing principle.

The handle bars 25 are constructed along the lines of the handle bars of a motorcycle and are mounted directly in front of the seat 23 and these handle bars form the means for controlling the rudder 36 and the ailerons 32 and 33. A vertically disposed pivot 58 is provided for the handle bars and the handle bars are adapted to swing around the same and the forward ends of the handle bars at the center portion thereof carries a toothed sector 59, which meshes with a relatively small bevelled gear wheel 60. The bevelled gear wheel 60 is keyed or otherwise secured to a longitudinally extending shaft 61, which is rotatably carried by suitable brackets 62 bolted or otherwise secured to the upper straight horizontally disposed edge 11 of the body 10.

An improved means has been provided for connecting the rudder 36 and the ailerons 32 and 33 with the shaft 61, so that the ailerons and the rudder 36 will be synchronously operated, so that the control of the machine will be semi-automatic. It also can be seen that the ailerons are so connected together, that when one of the same is raised, the other will be lowered thus making the machine especially simple and easy to handle and permitting of quick and short turns. The forward end of the shaft 61 has connected thereto the cross bar 63 and the terminals of this cross bar is provided with suitable eyes for the reception of the control cables 64, 65, 66 and 67, which extend to the ailerons 32 and 33.

The cable 64 is trained around or through suitable rollers or eyes 68 to the upper bracket 69 of the ailerons, while the cable 65 is trained around suitable rollers or eyes 70 to the lower bracket 71 of the aileron 33. The cable 66 is secured to the opposite end of the rod 63 and is trained around or through suitable rollers or eyes 72 and is secured to the upper end of the bracket 73 carried by the upper surface of the aileron 33. The cable 67 is then trained around or through suitable pulleys or eyes 74 and is secured to the lower bracket 75 of the aileron 32. Thus it can be seen that when the shaft 61 is turned, that one of the ailerons will be raised, while the other will be lowered. This makes the action of the ailerons positive and easy to operate. The shaft 61 adjacent to its rear end has secured thereto the bar 76, which extends outwardly from the opposite sides thereof and this bar has secured to its terminals the cables 77 and 78, which are trained around or through suitable rollers or eyes 80. The cables 77 and 78 are secured to the brackets 79, which extend outwardly from the opposite sides of the rudder 36. Thus it can be seen that when the handle bars 25 are turned, that the rudder 36 and the ailerons 32 and 33 will be synchronously operated.

The combined elevator and air brake 34 is provided with controlling means 81, which consists of a transversely extending shaft 82, which is rotatably mounted in a suitable bearing, carried by the lower end of the body 10 adjacent to its transverse center. The shaft 82 is located directly below the seat 23 and is provided with the pedals 83 and 84, which serve as means for rotating the shaft. The shaft 82 has formed or secured thereto in any preferred manner on each side of the body 10, the arms 85 and 86 and the opposite ends of these arms have secured eccentrically thereto the rigid control connecting rods 87 and 88. The rear ends of the connecting rods are pivotally secured to the brackets 90 and 91 carried by the lower surface of the brake 34. It can be seen that by pushing down on the pedals 83 and 84 in the correct direction, that the elevator and brake 34 can be raised or lowered. The elevator and brake 34 can be positioned directly at right angles to the trailing edge of the rear plane 30 and serves as an efficient brake for stopping the forward motion of the plane.

The machine is very easy to operate and handle and very little or no knowledge of aeronautics is required to use the same.

When starting the machine the same is positioned at the right angle, and the spark lever is kept at the correct point and the throttle opened little as possible. A push is then given to the propeller which will start the engine. This can be done from between the wings by reaching over the front wing or plane. After the engine has been started the pilot sits upon the seat 23 and places his feet firmly upon the pedals 83 and 84 after which the throttle is opened wide and when the machine has sufficient speed the pedals are operated, to actuate the combined elevator and brake to position the same at the correct point for elevating the machine. The aeroplane is then guided by means of the rudder 36, and it is merely necessary to turn the handle bars to the right or to the left where it is desired to turn to the right or left. When it is desired to descend with the machine, the engine is cut off, and the pilot can either glide to the ground, or operate his pedals, so as to turn the brake and elevator 34 at right angles to the rear wing and "pan cake" to the ground. This will permit of the machine being landed in a comparatively small space.

The machine has been designed for practical use either for pleasure or commercial purposes and is not designed for high altitude or fancy flying.

Changes in details may be made without departing from the spirit or scope of this invention, but what I claim as new is,

I claim:

1. In an aeroplane for scout work, a flat vertically disposed longitudinally extending fuselage formed of relatively thin material, supporting planes carried by the fuselage, a seat secured to the upper edge of the fuselage, and control means for the aeroplane disposed adjacent to said seat.

2. In a light aeroplane for scout work, a relatively thin flat fuselage, supporting planes carried by the fuselage, a seat secured to the upper edge of the fuselage, said fuselage being disposed in a vertical plane and extending longitudinally of the aeroplane forming a steadying keel therefor.

3. In an aeroplane, a relatively thin flat body disposed in a vertical plane, plates carried by the front and rear terminals of the body, a seat secured to the upper edge of the body, and control means for the aeroplane including handle bars and pedals, the pedals being carried by the body adjacent to the lower edge thereof and protruding from opposite sides thereof below said seat.

4. In an aeroplane, a relatively flat fuselage formed of thin material disposed in a vertical plane, supporting planes carried by the fuselage, an operator's seat secured to the upper edge of the flat fuselage, the forward edge of the fuselage having a cut-out portion therein, an engine fitted in said cut-out portion, a propeller driven by said engine, said fuselage also having a longitudinally extending slot communicating with said cut-out portion, a fuel tank for the engine fitted in said slot, and control means for the aeroplane engine carried by the fuselage and disposed adjacent to said seat.

5. In an aeroplane, a flat vertically disposed fuselage, a plane secured to the forward surface of the fuselage, a plane arranged below and secured to the rear end of the fuselage, a pilot seat secured to the upper edge of the fuselage between the planes, a motor, a propeller driven by the motor, a rudder, an elevator, and means for operating said rudder and elevator.

6. In an aeroplane, a substantially flat vertically disposed fuselage, a plane carried by the forward end of the fuselage, a plane carried by the rear end of the fuselage arranged below the first mentioned plane, a pair of ailerons carried by the first mentioned plane, a combined elevator and brake carried by the trailing edge of the last mentioned plane and extending the entire length of the same, a rudder carried by the rear end of the fuselage, means for synchronously operating the rudder and the ailerons, and means for operating the combined brake and elevator.

7. In an aeroplane, a substantially flat verticallly disposed fuselage, a plane carried by the forward end of the fuselage, a plane carried by the rear end of the fuselage, a stabilizer carried by the upper surface of the fuselage at the rear end thereof and arranged in parallel alignment therewith, a rudder hingedly carried by the rear edge of the stabilizer, a pair of ailerons carried by the first mentioned plane, a combined stabilizer and air brake carried by the last mentioned plane, means for synchronously operating the ailerons, so that when one is raised, the other will be lowered, means for synchronously operating the rudder with the ailerons, and means for operating the combined brake and elevator.

8. A flying machine comprising a substantially flat vertically disposed fuselage having a cut out portion formed in its forward end, an engine disposed in said cut out portion, said fuselage also having a longitudinally extending slot communicating with said cut out portion, a fuel tank for the engine fitted in said slot, a propeller driven by said motor, a plane carried by the upper edge of the fuselage adjacent to the forward end thereof, a plane carried by the rear end of the fuselage adjacent to the lower edge thereof, a rudder, ailerons, a combined brake and elevator, and means for operating said rudder, ailerons, and combined brake and elevator.

9. An aeroplane comprising a relatively thin vertically disposed fuselage having a cut out portion formed therein, an engine fitted in said cut out portion, a propeller driven by said engine, landing gear carried by the forward end of said fuselage and depending therefrom, a tail skid carried by the rear end of the fuselage, a plane carried by the forward end of the fuselage and secured to the upper edge thereof, an aileron hingedly connected to the plane adjacent to each end thereof, a rear plane, a transversely extending combined elevator and air brake hingedly secured to trailing edge of the rear plane, a stabilizer carried by the upper edge of the fuselage and arranged above the rear plane, a rudder hingedly connected to the rear edge of said stabilizer, a seat secured to the upper edge of the fuselage and arranged between said front and rear plane, a longitudinally extending shaft rotatably carried by the fuselage, means for rotating said shaft from said seat, a pair of arms secured to the front end of said shaft, a pair of arms secured to the rear end of said shaft, cables extending from said front pair of arms to said ailerons, cables extending from said rear pair of arms to said rudder, a transversely extending shaft rotatably carried by the fuselage, pedals carried by said shaft, crank arms secured to said shaft, brackets secured to said combined elevator and air brake, and links connecting said crank shaft to the brackets.

10. In an aeroplane structure, a plane, a rudder, a longitudinally extending shaft, a pair of arms secured to the front end of the shaft, a pair of arms secured to the shaft adjacent to its rear end, a pair of handle bars arranged for swinging movement, a sector rack secured to said handle bars, a bevelled gear carried by the rear end of the shaft and meshing with the sector rack, a cable connected to one end of the front pair of arms and extending to the upper edge of one of said ailerons, a cable secured to the same end and extending to the lower end of the other aileron, a cable secured to the other arm of the mentioned pair of arms and secured to the last mentioned ailerons, a second cable secured to the same arm and extending to the upper edge of the first mentioned aileron, and cables secured to the terminals of the second mentioned pair of arms and connected to the opposite sides of the rudder.

HANS P. SORENSEN.